June 7, 1966     E. P. WHITLOW     3,254,507
GENERATOR FOR ABSORPTION REFRIGERATION SYSTEM
Original Filed May 28, 1964
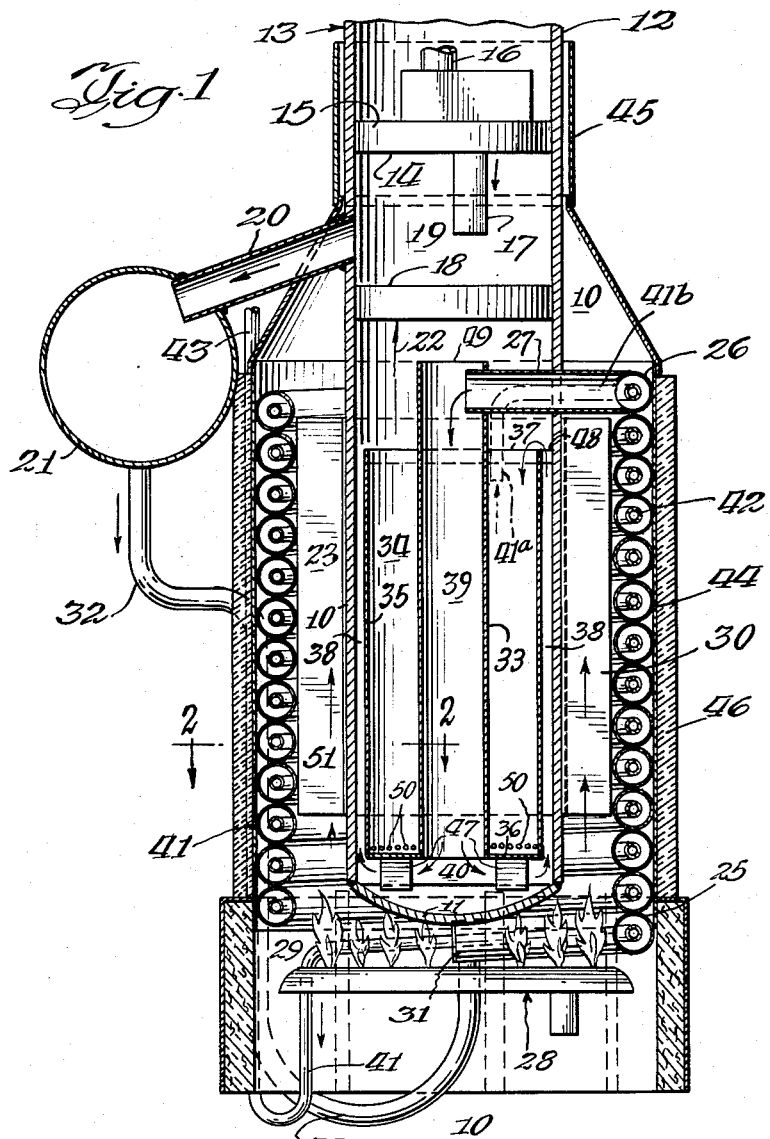

United States Patent Office 3,254,507
Patented June 7, 1966

3,254,507
GENERATOR FOR ABSORPTION REFRIGERATION SYSTEM
Eugene P. Whitlow, St. Joseph, Mich., assignor to Whirlpool Corporation, a corporation of Delaware
Continuation of application Ser. No. 370,902, May 28, 1964. This application May 12, 1965, Ser. No. 463,428
14 Claims. (Cl. 62—476)

This invention relates to a generator for an absorption refrigeration system. This application is a continuation of my copending application Serial No. 370,902, filed May 28, 1964.

In absorption refrigeration systems a generator is used to drive off, usually by boiling, the dissolved refrigerant such as ammonia from a rich solution of ammonia, usually an aqueous solution, with this refrigerant being then condensed into a liquid refrigerant for transfer to an evaporator where it evaporates to produce the low temperatures. In the generator the rich liquid is of course converted to a weak liquid which is then returned to the absorber.

One of the features of this invention is to provide an improved generator for an absorption refrigeration system which is compact and which utilizes a portion of a right liquid flow apparatus for both heat insulating a heating zone and preheating the rich liquid.

Another feature of the invention is to provide an improved generator with an internal baffling arrangement defining an improved liquid flow path.

Other features and advantages of the invention will be apparent from the following description of one embodiment as shown in the accompanying drawings. Of the drawings:

FIGURE 1 is a vertical sectional view through a generator embodying the invention and through a portion of a rectifier associated therewith.

FIGURE 2 is a fragmentary, horizontal sectional view taken substantially along line 2—2 of FIGURE 1.

In the embodiment shown in the drawings, there is provided a liquid containing shell 10 in the form of a metal cylinder having a rounded bottom 11 and an upper end 12 serving as the shell for a rectifier 13. A typical rectifier is disclosed and claimed in my copending application Serial No. 358,514, filed April 9, 1964, and assigned to the same assignee as the present application.

As is explained in this copending application, the rectifier comprises a series of vertically spaced liquid receiving plates 14 of dish shape with sides 15 press fitted within the rectifier shell 12. Liquid flows from one plate to the next lower plate through a downcomer tube 16, as explained in this copending application. The last tube 17 empties into a plate 18 and the rich liquid from the space 19 above the plate flows through a conduit 20 into a rich liquid receiver 21 which receives its rich liquid from the absorber (not shown). Each of the plates 14 and the plate 18 are permeable to the rising gaseous refrigerant indicated by the arrows 22, and this gaseous refrigerant has sufficient pressure to prevent the liquid from flowing through the openings (not shown) in the series of plates. Typical openings of this type are disclosed in my above copending application.

Extending radially outwardly from the other surface of the cylindrical shell 10 are a series of spaced vertical heat transfer baffles 23. Arranged adjacent the other edges of these baffles 23 is a vertically arranged helical conduit member or pipe 24 with contacting coils. This pipe 24 serves as an insulator to prevent heat leakage to the outside of the generator. The lowermost coil 25 is adjacent and below the rounded bottom 11 while the uppermost coil 26 is provided with a radially inwardly extending branch 27 extending through the shell 10 to about the center of this shell.

Below the bottom coil 25 is a burner 28 adapted to produce a circular arrangement of flame 29 that is beneath the heating zone 30 occupied by the vertical heat transfer baffles 23.

Rich liquid line 32 has one end connected to receiver 21 and its other end connected to the lowermost coil 25.

Located substantially centrally of the shell 10 is a baffle member 33 in the form of a vertical tube that is arranged to receive rich liquid from the upper pipe section 27.

Extending around the first baffle member 33 and spaced outwardly therefrom to provide a space 34 is a second baffle member 35 also in the shape of an upstanding tube. The lower ends of the baffle members 33 and 35 are connected by an annular plate 36 to define the bottom of the annular space 34. The upper end of this space is open and is defined by the circular edge 37 of the baffle 35.

The second baffle member 35 is spaced from the inner surface of the shell 10 to provide a liquid space 38 that is of annular cross section and that extends around the baffle member 35. As the bottom closure plate 36 is spaced above the bottom of the shell 10, liquid can flow from the top pipe section 27 into the space 39 that is on the interior of the first baffle member 33 and from there downwardly into the space 40 beneath the annular plate 36 but above the shell bottom 11. From here the liquid can flow upwardly into the annular space 38 and overflow the upper edge 37 into the annular space 34 previously described.

The top of the space 34 is provided with a pipe 41 having an inlet end 41a beneath the upper edge 37. This pipe 41 serves as a weak liquid passage member and extends into the interior of the upper pipe section 27 as indicated at 41b and from there extends in helical coils 42 substantially concentric with and spaced inwardly of the helical coils 24 of the rich liquid conduit member. With this arrangement, the two conduit members are substantially concentric and the weak liquid coils 42 are surrounded by and in heat exchange with the liquid within the rich liquid coil 24. The weak liquid pipe 41 extends out the end of the lower pipe section 31 and upwardly as indicated at 43 to deliver weak liquid to the absorber portion (not shown) of the refrigeration system.

The coils 24 are enclosed within a metal housing 44 whose upper end 45 also serves as a flue for the combustion gases after they have passed through the heating zone 30. Extending around the housing 44 opposite the coils 24 is a covering of heat insulation material 46 which may be fiberglass.

The assembly of the first baffle member 33, second baffle member 35 and annular bottom closure plate 36 is supported at the bottom by spaced legs 47 extending to the shell bottom 11 and by spaced top bracket 48 extending between the member 34 and the shell 10.

The operation of the generator is as follows. Rich liquid flowing down through the rectifier 13 flows from the lowermost tube 17 into the space 19 defined by the gas permeable plate 18. From this space 19 the rich liquid flows through the downwardly inclined conduit 20 into the receiver 21 and from here to the lowermost pipe 31 of the rich liquid conduit 24 by way of the pipe 32.

The rich liquid flows upwardly in the helical coil 24 and empties from the upper pipe section 27 into the space 39 within the tubular first baffle member 33. As is shown, the upper end 49 of this member 33 extends above the top edge 37 of the tubular second baffle member 35 in order that liquid from the space 34 cannot accidentially enter the upper end 49.

The rich liquid flows downwardly in the tubular member 33 and into the bottom space 40. From here the liquid flows upwardly in the narrow cylindrical space 39 between the tubular member 35 and the inner surface of the shell 10.

While the liquid is flowing upwardly in the space 38 it receives heat from the heating zone 30 not only by contact of the heated gases from the burner 28 with the outer surface of the shell 10 but also by heat transferred to the shell from the space by means of the plurality of radial baffles 23.

Due to this heating of liquid in the space 38 the dissolved refrigerant (for example, ammonia) is driven from the rich liquid as it passes up through the space 38 so that the rich liquid entering the bottom of the space 38 becomes weak liquid by the time it reaches the top of the space and spills over the top edge 37 into the space 34. In the example where the refrigerant is ammonia, the rich and weak liquids will be aqueous solutions of ammonia.

At the bottom of the weak liquid space 34 passages are provided exemplified by the plurality of openings 50 so that a small amount of weak liquid may be mixed with the rich liquid at the lower end of the heating space 38.

In the embodiment illustrated the generator is for a two pressure absorption refrigeration system. The lower pressure portion of the system serves to draw weak liquid from the space 34 into the pipe 41 and from there through the upwardly extending portion 43 of the pipe into the absorber portion of the refrigeration system as previously described.

In its passage through the pipe 41 the weak liquid is surrounded by the rich liquid in the coil 24. This arrangement is provided for a number of reasons. Thus, by providing the weak liquid coil 42 within the rich liquid coil 24 considerable space is saved so that the generator can be kept quite compact. The relatively hot weak liquid having just emerged from the heating space 38 flows countercurrently to the rich liquid in the coil 24 and preheats this rich liquid prior to its flow through the spaces 39 and 40 into the heating space 38. In addition, the surrounding rich liquid is preheated by absorbing heat from the heating zone. Thus, with this construction the weak liquid is not excessively warm when it is delivered to the absorber portion of the apparatus. In addition, the provision of the liquid coil 24 aids in preventing heat loss outwardly of the heating zone 30 and thereby acts as an insulating means so that more of the useful heat from the heating zone is transferred to the shell 10 and from there to the liquid space 38 previously described where the refrigerant is driven from the rich liquid. The heat flow from the zone into the liquid space 38 is indicated by the arrows 51.

The gaseous refrigerant driven from the liquid in the heating space 38 passes upwardly through the rectifier 13 in the manner previously described.

As can be noted from the above description, the generator is made quite compact yet is highly efficient in its operation. Thus, the liquid flow passages are defined by internested baffles 33 and 35 and the cooperating parts of the main shell 10. Furthermore, the actual flow area is quite compact as, between the upper limit as defined by the top of the tubular baffle 33 and the lower limit as defined by the bottom 11 of the shell 10, the liquid first flows downwardly in the space 39, then laterally at the bottom in the space 40, then upwardly in the heating space 38 and then downwardly over the edge 37 into the space 34 and then upwardly into the weak liquid pipe 41 from where it passes in helical coils as described. Thus, in this relatively short vertical space the liquid reverses its flow several times so that the space requirements for the generator are quite small.

Having described my invention as related to the embodiment shown in the accompanying drawings, it is my intention that the invention be not limited by any of the details of description, unless otherwise specified, but rather be construed broadly within its spirit and scope as set out in the accompanying claims.

The embodiment of the invention in which an exclusive property or privilige is claimed is defined as follows:

1. A generator for an absorption refrigeration system, comprising: a liquid containing shell; a baffle member adjacent said shell to define therewith a liquid space; means for flowing liquid rich in dissolved refrigerant into said space and liquid weak in dissolved refrigerant from said space; conduit means for rich liquid to said space including a rich liquid passage member spaced from said shell on a side opposite said baffle member to define a heating zone between the shell and the conduit means; and means for supplying heat to said zone simultaneously for heating liquid in said space to dispel dissolved refrigerant from said liquid and convert said rich liquid to said weak liquid, and for preheating the rich liquid in said passage member, said passage member thereby functioning as heat insulating means to retard heat losses from said zone and away from said space.

2. The generator of claim 1 wherein said zone is provided with spaced heat transfer members thermally associated with said shell.

3. The generator of claim 1 wherein said means for flowing weak liquid from said space comprises a weak liquid passage member in heat transfer and counterflow relationship with said rich liquid passage member, said rich liquid passage member being interposed between said heating zone and said weak liquid passage member.

4. A generator for an absorption refrigeration system, comprising: an enclosed liquid containing shell; a baffle member on the interior of said shell adjacent a shell inner surface to define therewith a liquid space; means for flowing liquid rich in dissolved refrigerant into said space and liquid weak in dissolved refrigerant from said space; conduit means for rich liquid to said space including a rich liquid passage member spaced from said shell on a side opposite said baffle member to define a heating zone between the shell and the conduit means, said rich liquid conduit member being arranged in coils around said shell; means for supplying heat to said zone simultaneously for heating liquid in said space to dispel dissolved refrigerant from said liquid and convert said rich liquid to said weak liquid, and for preheating the rich liquid in said passage member; and a weak liquid passage member from said liquid space in heat transfer and counterflow relationship with said rich liquid passage member, said rich liquid passage member being interposed between said heating zone and said weak liquid passage member.

5. The generator of claim 4 wherein said weak liquid passage member is located internally of said rich liquid passage member.

6. A generator for an absorption refrigeration system, comprising: an enclosed liquid containing shell having a top and bottom; a baffle member on the interior of said shell adjacent a shell inner surface to define therewith a liquid space; conduit means to said space including a first rich liquid passage member spaced from said shell on a side opposite said baffle member to define a heating zone between the shell and the conduit means and a second rich liquid passage member leading to adjacent said shell bottom for flow of liquid upwardly in said liquid space; and means for supplying heat to said zone simultaneously for heating liquid in said space to dispel dissolved refrigerant from said liquid and convert said rich liquid to said weak liquid, and for preheating the rich liquid in said first rich liquid passage member, said first rich liquid passage member thereby functioning as heat insulating means to retard heat losses from said zone and away from said space.

7. The generator of claim 6 wherein said second rich liquid passage member comprises a conduit spaced from said baffle member to define a weak liquid chamber into which weak liquid flows at the top of said space.

8. The generator of claim 7 wherein said first rich liquid passage member empties into said second rich liquid passage member, and said second passage member is open at the top which is located above said weak liquid chamber to prevent flow of weak liquid from said weak liquid chamber into said second passage member.

9. A generator for an absorption refrigeration system, comprising: an enclosed liquid containing shell having a top and bottom; a baffle member on the interior of said shell adjacent a shell inner surface to define therewith a liquid space; conduit means to said space including a first rich liquid passage member spaced from said shell on a side opposite said baffle member to define a heating zone between the shell and the conduit means and a second rich liquid passage member leading to adjacent said shell bottom for flow of liquid upwardly in said liquid space, said second rich liquid passage member comprising a conduit spaced from said baffle member to define a weak liquid chamber into which weak liquid flows at the top of said space, said first rich liquid passage member emptying into said second rich liquid passage member, and said second passage member is open at the top which is located above said weak liquid chamber to preevnt flow of weak liquid from said weak liquid chamber into said second passage member; means for supplying heat to said zone simultaneously for heating liquid in said space to dispel dissolved refrigerant from said liquid and convert said rich liquid to said weak liquid, and for preheating the rich liquid in said first rich liquid passage member, said first rich liquid passage member thereby functioning as heat insulating means to retard heat losses from said zone and away from said space; and a weak liquid passage member from said liquid space in heat transfer and counterflow relationship with said rich liquid passage member, said rich liquid passage member being interposed between said heating zone and said weak liquid passage member.

10. A generator for an absorption refrigeration system, comprising: an enclosed liquid containing shell having a top and bottom; a baffle member on the interior of said shell adjacent a shell inner surface to define therewith a liquid space, said baffle member being continuous in cross section; conduit means to said space including a first rich liquid passage member spaced from said shell on a side opposite said baffle member to define a heating zone between the shell and the conduit means and a second rich liquid passage member leading to adjacent said shell bottom for flow of liquid upwardly in said liquid space, said second passage member being located within and spaced from said baffle member to define a liquid receiving chamber having closure means at the bottom, said first rich liquid passage member emptying into said second rich liquid passage member, and said second passage member is open at the top which is located above said weak liquid chamber to prevent flow of weak liquid from said weak liquid chamber into said second passage member, weak liquid thereby overflowing to the top of said baffle member into said chamber; means for supplying heat to said zone simultaneously for heating liquid in said space to dispel dissolved refrigerant from said liquid and convert rich liquid to said weak liquid, and for preheating the rich liquid in said first rich liquid passage member, said first rich liquid passage member thereby functioning as heat insulating means to retard heat losses from said zone and away from said space; and a weak liquid passage member from said chamber extending within said first rich liquid passage member in counterflow relationship therewith to receive heat from said first passage member and to be isolated from said heating zone.

11. A generator for an absorption refrigeration system, comprising: a liquid containing enclosing shell; a first tubular baffle member inwardly of said shell; a second tubular baffle member outwardly of said first baffle member and adjacent said shell to define a liquid space between said second member and shell; means for flowing liquid rich in dissolved refrigerant through said first tubular member and from there into said liquid space; means for flowing liquid weak in dissolved refrigerant from said liquid space; and means for applying heat to said shell on the side opposite said second baffle member to drive refrigerant from the rich liquid in said space and convert it to liquid weak in dissolved refrigerant.

12. The generator of claim 11 wherein said shell and said first and second baffle members are concentric.

13. A generator for an absorption refrigeration system, comprising: a liquid containing enclosing shell; a first taubular baffle member inwardly of said shell; a second tubular baffle member outwardly of said first baffle member and adjacent said shell to define a liquid space between said second member and shell; means for flowing liquid weak in dissolved refrigerant from said liquid space into the space between said first and second baffle members, and from there to the exterior of said generator; and means for applying heat to said shell on the side opposite said second baffle member to drive refrigerant from the rich liquid in said space and convert it to liquid weak in dissolved refrigerant including spaced heat transfer members extending outwardly from said shell.

14. A generator for an absorption refrigeration system, comprising: a liquid containing shell defining a liquid space; means for flowing liquid rich in dissolved refrigerant into said space and liquid weak in dissolved refrigerant from said space; conduit means for rich liquid to said space including a rich liquid passage member spaced from said shell to define a heating zone between the shell and the conduit means, said means for flowing weak liquid from said space comprising a weak liquid passage member in heat transfer and counterflow relationship with said rich liquid passage member, said rich liquid passage member being interposed between said heating zone and said weak liquid passage member; and means for supplying heat to said zone simultaneously for heating liquid in said space to dispel dissolved refrigerant from said liquid and convert said rich liquid to said weak liquid, and for preheating the rich liquid in said passage member, said passage member thereby functioning as heat insulating means to retard heat losses from said zone and away from said space.

References Cited by the Examiner

UNITED STATES PATENTS

| 1,729,355 | 9/1929 | Munters | 62—497 |
| 2,337,653 | 12/1943 | Ehnbom | 62—487 |
| 2,729,952 | 1/1956 | Whitlow | 62—487 X |

ROBERT A. O'LEARY, *Primary Examiner.*